US010318383B2

United States Patent
Yi et al.

(10) Patent No.: US 10,318,383 B2
(45) Date of Patent: Jun. 11, 2019

(54) NODE DIAGNOSIS APPARATUS AND SYSTEM

(71) Applicant: FUJITSU LIMITED, Kawasaki-shi, Kanagawa (JP)

(72) Inventors: Su Yi, Beijing (CN); Hao Wang, Beijing (CN); Xiaojing Fan, Beijing (CN); Lefei Wang, Beijing (CN); Wenqian Xue, Beijing (CN); Ryuichi Matsukura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 64 days.

(21) Appl. No.: 15/723,984

(22) Filed: Oct. 3, 2017

(65) Prior Publication Data

US 2018/0101446 A1 Apr. 12, 2018

(30) Foreign Application Priority Data

Oct. 11, 2016 (CN) .......................... 2016 1 0885223

(51) Int. Cl.
*H04L 12/26* (2006.01)
*G06F 11/14* (2006.01)
(Continued)

(52) U.S. Cl.
CPC .......... *G06F 11/1425* (2013.01); *H04L 43/16* (2013.01); *H04L 43/50* (2013.01);
(Continued)

(58) Field of Classification Search
CPC ..... H04W 68/12; H04W 24/04; H04W 72/08; H04W 24/06; H04W 72/802; H04L 12/26; H04L 43/50
See application file for complete search history.

(56) References Cited

U.S. PATENT DOCUMENTS

2005/0058151 A1* 3/2005 Yeh ....................... H04W 52/46
370/445
2009/0149133 A1 6/2009 Yoneyama
(Continued)

FOREIGN PATENT DOCUMENTS

CN 102612161 A 7/2012
EP 2 996 425 A1 3/2016

OTHER PUBLICATIONS

Mittal, K., et al., "RTSS/CTSS: Mitigation of Exposed Terminals in Static 802.11-Based Mesh Networks," in Proceedings of WiMesh, Oct. 2006.
(Continued)

*Primary Examiner* — Mewale A Ambaye
(74) *Attorney, Agent, or Firm* — Arent Fox LLP

(57) ABSTRACT

Embodiments of this disclosure provide a node diagnosis apparatus and system. The node diagnosis apparatus includes: a first receiving unit configured to receive notifications related to busyness/idleness of channels reported by other nodes; a first transmitting unit configured to, when the first receiving unit receives a first notification related to busyness/idleness of channels reported by a first node and a second notification related to busyness/idleness of channels reported by a second node and the first node and the second node are in different basic service sets, transmit a control signal to the first node and the second node; a second receiving unit configured to receive one or more first parameters reported by the first node and one or more second parameters reported by the second node; and a first determining unit configured to determine that the first node and the second node are exposed nodes when the one or more first parameters and the one or more second parameters satisfy a predetermined condition. With the embodiments of this disclosure, whether a node is an exposed node may be (Continued)

well identified, with complexity of identification being low, and signaling being simple.

12 Claims, 12 Drawing Sheets

(51) Int. Cl.
*H04W 68/12* (2009.01)
*H04W 72/08* (2009.01)
*H04W 24/04* (2009.01)
*H04W 24/06* (2009.01)
*H04W 74/08* (2009.01)

(52) U.S. Cl.
CPC .......... *H04W 24/04* (2013.01); *H04W 68/12* (2013.01); *H04W 72/082* (2013.01); *H04W 24/06* (2013.01); *H04W 74/0816* (2013.01)

(56) References Cited

U.S. PATENT DOCUMENTS

2010/0124171 A1* 5/2010 Yoneyama ........ H04W 74/0825
370/242
2016/0309480 A1* 10/2016 Verma ................. H04W 52/267

OTHER PUBLICATIONS

Xing, X., et al., "A Multichannel MAC Protocol to Solve Exposed Terminal Problem in Multihop Wireless Networks," 6th IEEE Consumer Communications and Networking Conference, 2009.
Yeh, C., "The Heterogeneous Hidden/Exposed Terminal Problem for Power-controlled Ad Hoc MAC Protocols and Its Solutions," 59th IEEE Vehicular Technology Conference, pp. 2548-2554, 2004.

* cited by examiner

NODE DIAGNOSIS APPARATUS AND SYSTEM

CROSS-REFERENCE TO RELATED APPLICATIONS

This application claims priority to Chinese Patent Application No. 201610885223.X, filed Oct. 11, 2016. The disclosure of the priority application is incorporated in its entirety herein by reference.

TECHNICAL FIELD

This disclosure relates to the field of network technologies, and in particular to a node diagnosis apparatus and system in network failure diagnosis.

BACKGROUND

In wireless networks, an exposed node problem, or an exposed terminal problem occurs when a node is prevented from sending packets to other nodes because of a neighboring transmitter. FIG. 1 is a schematic diagram of a scenario of exposed nodes in an existing network. As shown in FIG. 1, there are 4 nodes T1, R1, T2 and R2 in the network The receivers R1 and R2 are out of range of each other, yet the transmitters T1 and T2 in the middle are in range of each other. Here, if data transmission between T1 and R1 is taking place, node T2 is prevented from transmitting data to R2 as it concludes after carrier sense that it will interfere with the data transmission by its neighbor T1.

However, in such a case, R2 could still receive the data transmission from T2 without interference because it is out of range of T1. In the example shown in FIG. 1, node T1 and T2 are exposed nodes to each other.

The exposed problem exists in a wireless system which employ a carrier sense multiple access/collision avoidance (CSMA/CA) mechanism for channel access, such as Institute of Electrical and Electronics Engineers (IEEE) 802.11, 802.15.4, 802.15.6, and so on. When this exposed node problem happens, a media access protocol (MAC) mechanism, such as CSMA/CA mechanism, cannot function efficiently.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In the prior art, IEEE 802.11 uses 802.1.1 request to send/clear to send (RTS/CTS) acknowledgment and handshake packets to overcome the exposed node problem, to a certain extent. RTS/CTS is not a complete solution and may decrease throughput since it introduces high amount of overhead to the network.

Therefore, node diagnosis is needed for solving the exposed node problem. Embodiments of this disclosure provide a node diagnosis apparatus and system, aiming to identify whether a node is an exposed node, which may help diagnose a trouble or performance degradation in a network, with complexity of identification being low, and signaling being simple.

According to a first aspect of the embodiments of this disclosure, there is provided a node diagnosis apparatus, configured in a control node, the node diagnosis apparatus including:

a first receiving unit configured to receive notifications related to busyness/idleness of channels reported by other nodes;

a first transmitting unit configured to, when the first receiving unit receives a first notification related to busyness/idleness of channels reported by a first node and a second notification related to busyness/idleness of channels reported by a second node and the first node and the second node are in different basic service sets, transmit a control signal to the first node and the second node, so that the first node and the second node simultaneously transmit test packets respectively within a first time according to the control signal;

a second receiving unit configured to receive one or more first parameters related to a rate of success of data transmission reported by the first node and one or more second parameters related to a rate of success of data transmission reported by the second node; and a first determining unit configured to determine that the first node and the second node are exposed nodes when the one or more first parameters and the one or more second parameters satisfy a predetermined condition.

According to a second aspect of the embodiments of this disclosure, there is provided a node diagnosis apparatus, configured in a first node, the node diagnosis apparatus including:

a first generating unit configured to generate a first notification related to busyness/idleness of channels;

a first reporting unit configured to report the first notification to a control node; a third receiving unit configured to receive a control signal transmitted by the control node; wherein the control signal is transmitted by the control node when the control node determines that it further receives a second notification related to busyness/idleness of channels reported by a second node and the first node and the second node are in different basic service sets;

a processing unit configured to transmit test packets according to the control signal and count one or more first parameters related to a rate of success of data transmission; and a second reporting unit configured to report the one or more first parameters, so that the control node determines that the first node and the second node are exposed nodes when the one or more first parameters and one or more second parameters reported by the second node satisfy a predetermined condition.

According to a third aspect of the embodiments of this disclosure, there is provided a node diagnosis system, including a control node, a first node and a second node, the first node is configured to generate a first notification related to busyness/idleness of channels and report it to the control node;

the second node is configured to generate a second notification related to busyness/idleness of channels and report it to the control node;

the control node is configured to receive the first notification and the second notification and generate a control signal when the first node and the second node are in different basic service sets, and transmit the control signal to the first node and the second node;

the first node is configured to transmit a test packet according to the control signal, count one or more first parameters related to a rate of success of data transmission and report to the control node, and the second node is configured to transmit a test packet according to the control signal, count one or more second parameters related to a rate of success of data transmission and report to the control node;

and the control node is configured to determine that the first node and the second node are exposed nodes according to the one or more first parameters and the one or more second parameters when the one or more first parameters and the one or more second parameters satisfy a predetermined condition.

An advantage of the embodiments of this disclosure exists in that in receiving the notifications related to busyness/idleness of channels reported by two different nodes belonging to different basic service sets, controlling the two nodes to transmit test packets; and whether a node is an exposed node may be identified according to parameters related to a rate of success of data transmission reported by the two nodes, which may help diagnose the trouble or performance degradation in a network, with complexity of identification being low, and signaling being simple.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the embodiments of this disclosure will be apparent with reference to the following description and attached drawings. These embodiments are illustratively only, and are not intended to limit this disclosure. For the principle implementations of this disclosure to be easily understood by those skilled in the art, the embodiments of this disclosure shall be described by taking a CSMA CA 802.11 wireless network as an example. However, it should be understood that the embodiments of this disclosure are not limited to the above network. For example, the method, apparatus and system provided by the embodiments of this disclosure may also be applicable to other wireless networks needing node diagnosis.

For the sake of easy understanding, types of exposed nodes existing in the embodiments of this disclosure shall be described below, and FIGS. 2-7 are schematic diagrams of scenarios in this disclosure where there possibly exist the types of exposed nodes.

Figure 1:
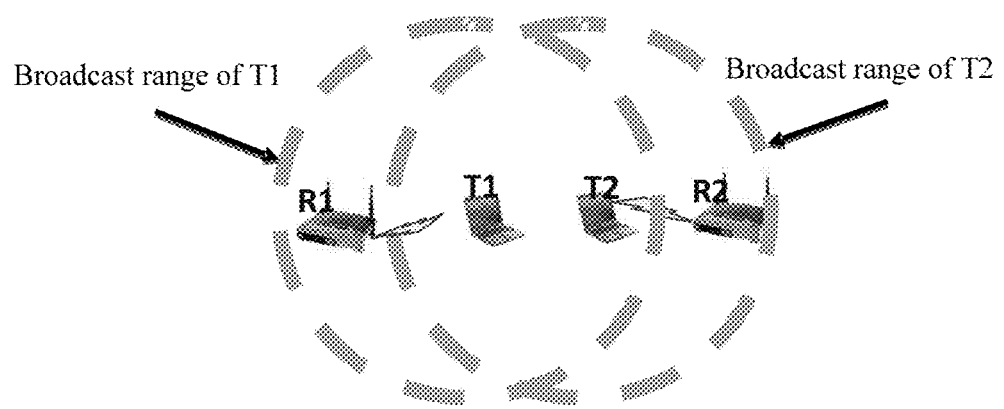
FIG. 1 is a schematic diagram of a scenario in an existing network where there exist exposed nodes.
Figure 2:
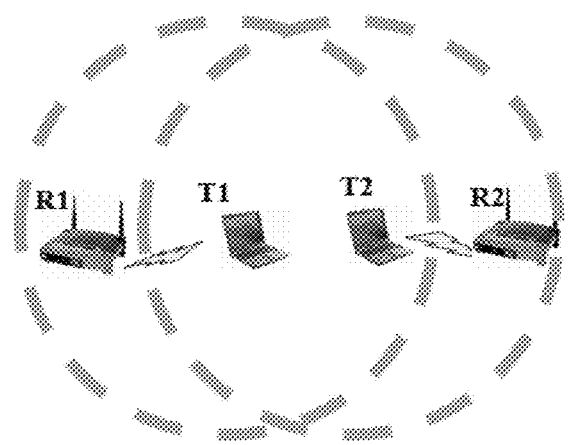
FIG. 2 is a schematic diagram of a scenario in this disclosure where there possibly exists a type of exposed nodes.
Figure 3:
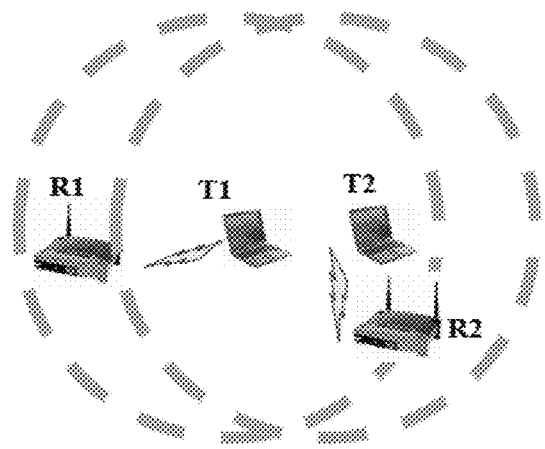
FIG. 3 is another schematic diagram of the scenario in this disclosure where there possibly exists a type of exposed nodes.

As shown in FIGS. 2 and 3, a pair of nodes T1 and T2 that are possibly exposed nodes to each other are both terminals (stations).

Figure 4:
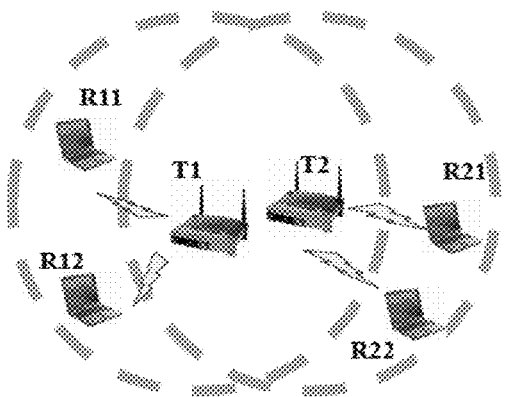
FIG. 4 is a further schematic diagram of the scenario in this disclosure where there possibly exists a type of exposed nodes.
Figure 5:
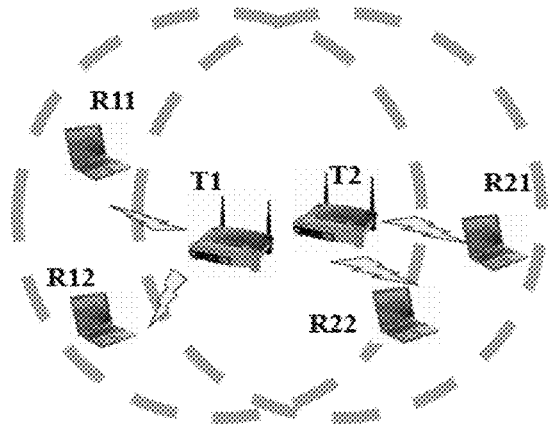
FIG. 5 is still another schematic diagram of the scenario in this disclosure where there possibly exists a type of exposed nodes.

As shown in FIGS. 4 and 5, a pair of nodes T1 and T2 that are possibly exposed nodes to each other are both access points (APs). In this embodiment, the access points may be connected to multiple terminals. For example, T1 may be connected to R11 and R12, respectively, T2 may be connected to R21 and R22, respectively, and there exist different exposing relationships between T2-R21, T2-R22 and T1-R11, T1-R12.

Figure 6:
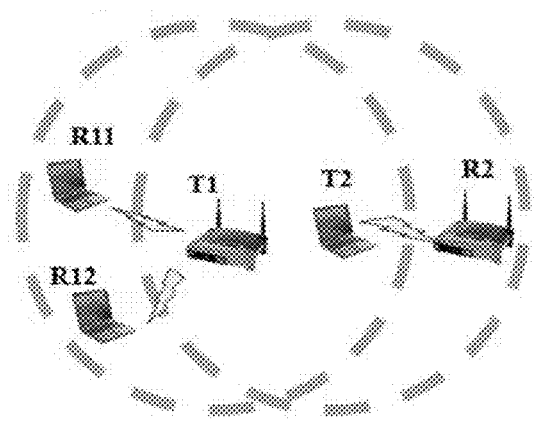
FIG. 6 is yet another schematic diagram of the scenario in this disclosure where there possibly exists a type of exposed nodes.
Figure 7:
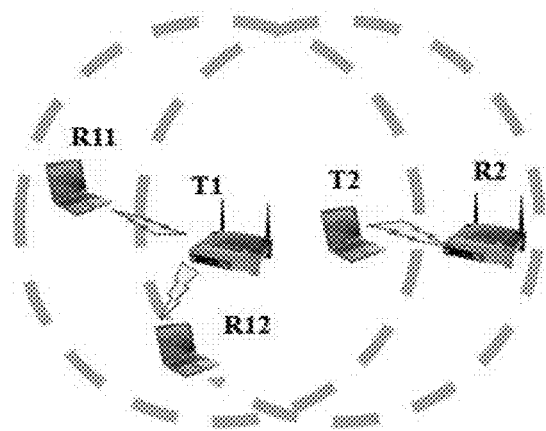
FIG. 7 is yet still another schematic diagram of the scenario in this disclosure where there possibly exists a type of exposed nodes.

As shown in FIGS. 6 and 7, a pair of nodes T1 and T2 that are possibly exposed nodes to each other are an access point (AP) and a terminal respectively. In this embodiment, T1 may be connected to R11 and R12, respectively, and there exist different exposing relationships between T2-R2 and T1-R11 and T1-R12. FIGS. 2-7 only schematically show application scenarios of the embodiments of this disclosure; however, this disclosure is not limited thereto. For example, T1 may be a terminal, T2 is an access point. Scenarios are similar to those shown in FIGS. 6 and 7, and shall not be described herein any further.

Particular embodiments of this disclosure shall be described below with reference to the accompanying drawings.

Embodiment 1

Figure 8:
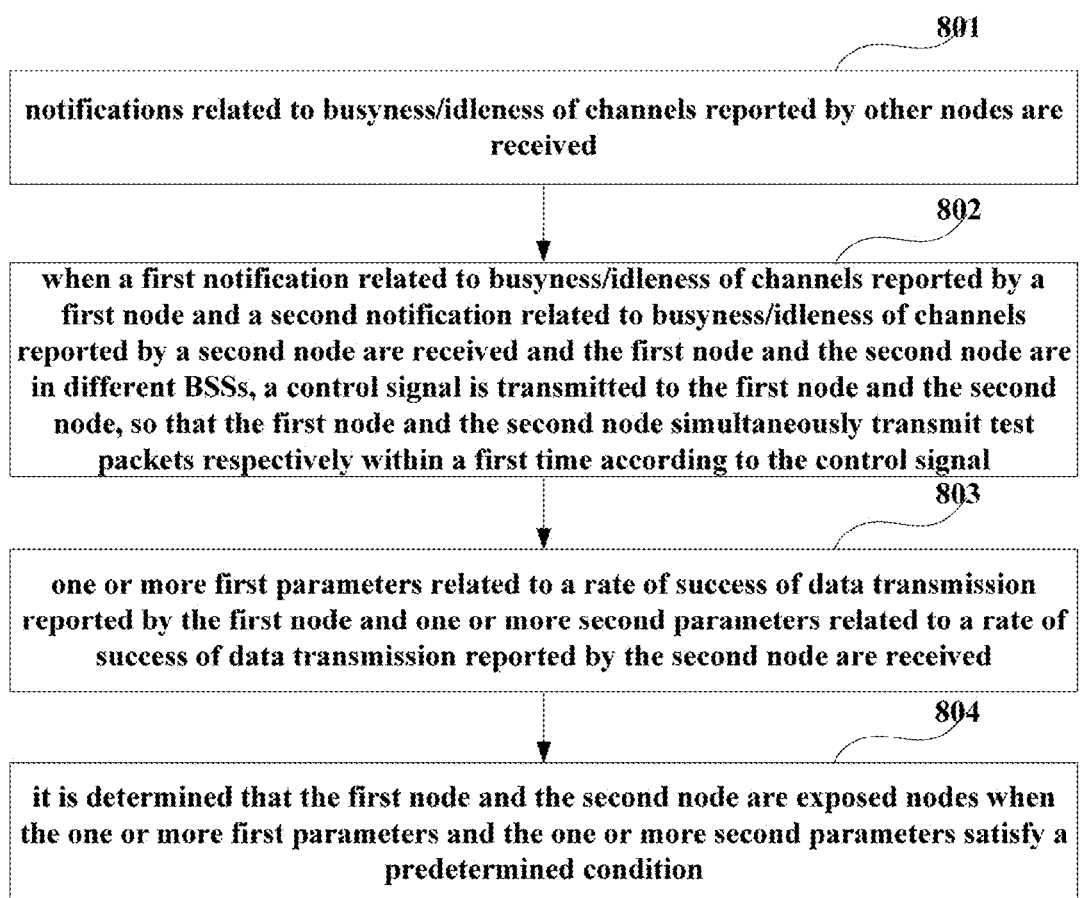
FIG. 8 is a flowchart of a node diagnosis method of Embodiment 1 of this disclosure.

The embodiment of this disclosure provides a node diagnosis method, applicable to a control node side. FIG. 8 is a flowchart of the node diagnosis method of the embodiment of this disclosure. As shown in FIG. 8, the node diagnosis method includes:

step 801: notifications related to busyness/idleness of channels reported by other nodes are received;

step 802: when a first notification related to busyness/idleness of channels reported by a first node and a second notification related to busyness/idleness of channels reported by a second node are received and the first node and the second node are in different basic service sets (BSSs), a control signal is transmitted to the first node and the second node, so that the first node and the second node simultaneously transmit test packets respectively within a first time according to the control signal;

step 803: one or more first parameters related to a rate of success of data transmission reported by the first node and one or more second parameters related to a rate of success of data transmission reported by the second node are received; and step 804: it is determined that the first node and the second node are exposed nodes when the one or more first parameters and the one or more second parameters satisfy a predetermined condition.

In this embodiment, the control node may be a gateway, or an access controller (AC), or an access network controller (ANC), or a coordinator, etc., in a network; in this embodiment, APs in the network are all connected to the control node. However, this disclosure is not limited thereto, and the control node may also be another network device, and may further be integrated into an AP.

In this embodiment, in step 801, the control node may predetermine a time (hereinafter denoted by a fourth time) for receiving the notifications related to busyness/idleness of channels reported by the other nodes, that is, the notifications reported by the other nodes within the fourth time are only detected; in this embodiment, following Embodiment 2 may be referred to for an implementation of the notifications related to busyness/idleness of channels.

In step 802, whether the first notification related to busyness/idleness of channels and the second notification related to busyness/idleness of channels reported by the first node and the second node being in different basic service sets are received may be judged; in this embodiment, when a result of judgment is yes, the first node and the second node are determined as being a pair of nodes possibly exposed to each other, and a control signal is transmitted to the node pair; and when a result of judgment is no, it is determined that there exists no exposed node in the network. In this embodiment, Embodiment 2 may be referred to for implementations of simultaneously transmitting the test packets by the first node and the second node respectively within the first time according to the control signal.

In a wireless local area network in an infrastructure mode, an AP and a terminal associated with it constitute a basic service set. How to determine that the first node and the second node are in different basic service sets may be performed according to, for example, an AP or a gateway where the first node and the second node are located. However, this disclosure is not limited thereto, and other methods in the related art may also be employed to determine whether they are in different basic service sets.

In this embodiment, the control signal may be used to disable carrier sensing functions of the first node and the second node, so that the first node and the second node enter into test modes, thereby improving accuracy of test.

In step 803, the parameters related to a rate of success of data transmission reported by the nodes include: a ratio of acknowledgement frames to total transmission data frames within the first time (ACK ratios), or a rate of success of packet transmission within the first time, or a packet drop ratio within the first time; however, this embodiment is not limited thereto. Embodiment 2 may be referred to for an implementation for acquiring the parameters. As the reported parameters are used for characterizing the rate of success of data transmission (or rate of unsuccess), whether there exist exposed nodes interfering with each other in the network may be judged according to whether the parameters satisfy the predetermined condition.

In step 803, the parameters related to the rate of success of data transmission reported by the nodes are related to types of the nodes. For example, when the first node and the second node are terminals, the numbers of the reported first parameters and second parameters are one, respectively; when the first node and the second node are access points and the number of terminals associated with them is multiple, the number of first parameters and second parameters respectively reported by the first node and the second node are multiple, corresponding respectively to the multiple terminals associated with them; when the first node is an access point, the number of terminals associated with it are multiple and the second node is a terminal, the number of the reported first parameters is multiple, corresponding respectively to the multiple terminals associated with it, and the number of the second parameters is one; and when the second node is an access point, the number of terminals associated with it is multiple and the first node is a terminal, the number of the reported second parameter is multiple, corresponding respectively to the multiple terminals associated with it, and the number of the first parameters is one.

In step 804, the first node and the second node may be determined as exposed nodes when the one or more first parameters and the one or more second parameters satisfy the predetermined condition.

In one implementation, the larger the first parameter and/or the second parameter related to the rate of success of data transmission, the higher the rate of success of data transmission. For example, the parameter is the ratio of acknowledgement frames to total transmission data frames, or a rate of success of packet transmission, etc., and the predetermined condition may be that, when the first node reports one first parameter and the second node reports one second parameter, the first parameter is greater than the first threshold value and the second parameter is greater than the second threshold value, or, when the first node reports multiple first parameters and the second node reports one second parameter, each of the first parameters is greater than the first threshold value and the second parameter is greater than the second threshold value, or, when the first node reports multiple first parameters and the second node reports multiple second parameters, each of the first parameters is greater than the first threshold value and each of the second parameters is greater than the second threshold value, or, when the first node reports one first parameter and the second node reports multiple second parameters, the first parameter is greater than the first threshold value and each of the second parameters is greater than the second threshold value, In another implementation, the smaller the first parameters and/or the second parameters related to a rate of success of data transmission, the higher the rate of success of data transmission. For example, the parameter is a packet drop ratio, etc., and the predetermined condition may be that, when the first node reports multiple first parameters and the second node reports multiple second parameters, each of the first parameters is less than the first threshold value and each of the second parameters is less than the second threshold value, or, when the first node reports one first parameter and the second node reports multiple second parameters, the first parameter is less than the first threshold value and each of the second parameters is less than the second threshold value, or, when the first node reports one first parameter and the second node reports one second parameter, the first parameter is less than the first threshold value and the second parameter is less than the second threshold value, or, when the first node reports multiple first parameters and the second node reports one second parameter, each of the first parameter is less than the first threshold value and the second parameter is less than the second threshold value.

In this embodiment, the first threshold value (threshold$_1$) and the second threshold value (threshold$_2$) may be set as demanded, and this embodiment is not limited thereto.

How to determine that the nodes are exposed nodes to each other shown in FIGS. 2-7 shall be described below by taking that the parameter reported by the nodes is ACK ratio as an example.

As shown in FIGS. 2 and 3, as T1 and T2 are both terminals, the number of the first parameters reported by T1 and received by the control node is one, and the number of the second parameters reported by T2 is also one. When the ACK ratio of T1 is greater than threshold$_1$ and the ACK ratio of T2 is greater than threshold$_2$, it is determined that T1 and T2 are exposed nodes to each other (as shown in FIG. 2); otherwise, it is determined that T1 and T2 are not exposed nodes to each other (as shown in FIG. 3).

As shown in FIGS. 4 and 5, T1 is an AP, terminals connected to it are R11 and R12, and T2 is also an AP, terminals connected to it are R21 and R22. Hence, the number of the first parameters reported by T1 and received by the control node is two, corresponding respectively to T1-R11 and T1-R12, and the number of the second parameters reported by T2 is two, corresponding respectively to T2-R21 and T2-R22. And when the ACK ratios reported by T1 are both greater than threshold$_1$ and the ACK ratios reported by T2 are both greater than threshold$_2$, it is determined that T1 and T2 are exposed nodes to each other (as shown in FIG. 4); otherwise, it is determined that T1 and T2 are not exposed nodes to each other (as shown in FIG. 5).

As shown in FIGS. 6 and 7, T1 is an AP, terminals connected to it are R11 and R12, and T2 is a terminal. Hence, the number of the first parameters reported by T1 and received by the control node is two, corresponding respectively to T1-R11 and T1-R12, and the number of the second parameters reported by T2 is one. And when the ACK ratios reported by T1 are both greater than threshold$_1$ and the ACK ratio reported by T2 is greater than threshold$_2$, it is determined that T1 and T2 are exposed nodes to each other (as shown in FIG. 6); otherwise, it is determined that T1 and T2 are not exposed nodes to each other (as shown in FIG. 7).

It can be seen from the above embodiments that in receiving the notifications related to busyness/idleness of channels reported by two different nodes belonging to different basic service sets, controlling the two nodes to transmit test packets; and whether a node is an exposed node may be identified according to parameters related to a rate of success of data transmission reported by the two nodes, which may help diagnose the trouble or performance degradation in a network, with complexity of identification being low, and signaling being simple.

Embodiment 2

Embodiment 2 of this disclosure provides a node diagnosis method, applicable to a first node side and/or a second node. In this embodiment, the first node side and/or the second node is/are a common(s) in a network other than the control node in Embodiment 1. As processing of the first node side and the second node is identical or similar, following description shall be given by taking the first node as an example.

Figure 9:
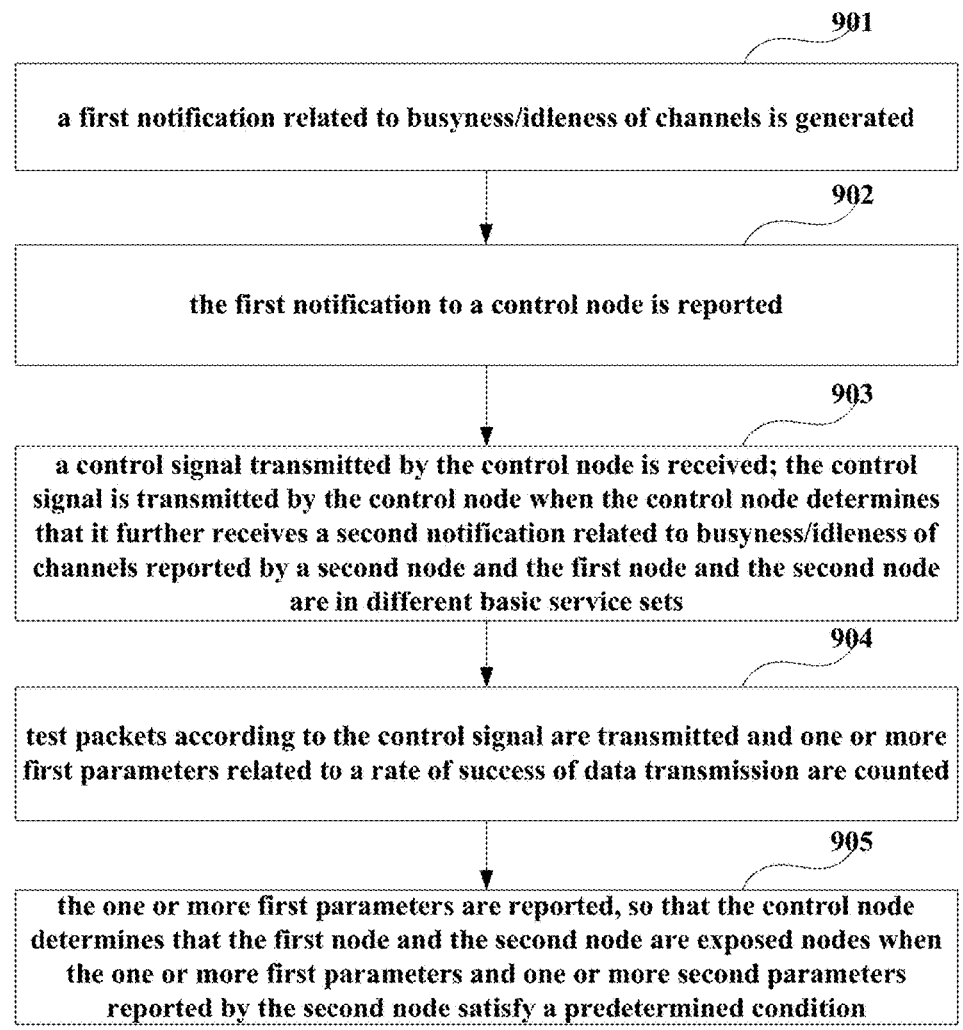
FIG. 9 is a flowchart of a node diagnosis method of Embodiment 2 of this disclosure.

FIG. 9 is a flowchart of the node diagnosis method of the embodiment of this disclosure. As shown in FIG. 9, the node diagnosis method includes:

step 901: a first notification related to busyness/idleness of channels is generated;

step 902: the first notification to a control node is reported;

step 903: a control signal transmitted by the control node is received; in this embodiment, the control signal is transmitted by the control node when the control node determines that it further receives a second notification related to busyness/idleness of channels reported by a second node and the first node and the second node are in different basic service sets;

step 904: test packets according to the control signal are transmitted and one or more first parameters related to a rate of success of data transmission are counted; and step 905: the one or more first parameters are reported, so that the control node determines that the first node and the second node are exposed nodes when the one or more first parameters and one or more second parameters reported by the second node satisfy a predetermined condition.

In step 901, the first node may generate the first notification in a manner as follows: a third parameter related to busyness/idleness of channels is counted; and the first notification when the third parameter is greater than a third threshold value is generated; in this embodiment, the third parameter includes: a ratio of the number of times of assessing that a channel is in a busy state within a second time to a total number of times of sensing channels; or the third parameter may be channel utilization, or a parameter indirectly reflecting busyness/idleness of channels, such as a contention window (CW) use for random backoff, etc.

For example, the first node may take a ratio of the number of times of feeding back that a channel is in a busy state within the second time according to clear channel assessment (CCA) to the total number of times of sensing channels as the third parameter chanBusyRatio, and generate the first notification when the third parameter chanBusyRatio is greater than a third threshold value threshold$_3$. In this embodiment, the third threshold value may be determined as demanded, and this embodiment is not limited thereto.

In this embodiment, the second time may be preset as demanded. For example, it may be set to be less than or equal to the fourth time in Embodiment 1; however, this embodiment is not limited thereto.

In step 904, as described in Embodiment 1, the first node disables a carrier-sensing function after receiving the control signal, enters into the test mode, and transmits test packets successively within the first time, so as to count the first parameters.

In this embodiment, the first node may transmit a next test packet when ACK of a previous test packet is received, or directly transmit a next test packet when ACK of a previous test packet is not received within a third time, and count the first parameters related to the rate of success of data transmission within the first time.

In one implementation, in step 904, when the first node is a terminal, the first node transmits test packets successively to an AP connected to it within the first time and counts first parameters within the first time. As the first node is a terminal, the number of the first parameters counted by it is one. And in step 905, the first node reports the first parameter.

In another implementation, in step 904, when the first node is an access point and the number of terminals associated with the access point is multiple, the first node cyclically transmits test packets to the multiple terminals connected to it successively and counts a first parameter related to a rate of success of data transmission between it and each terminal to obtain multiple first parameters. And in step 905, the first node reports the multiple first parameters.

How to transmit the data packets and count the first parameters shall be described below by taking FIG. 6 as an example. As show in FIG. 6, T2 is a terminal, successively transmits within the first time to the access point R2 connected to it (such as transmitting a test packet first, and then transmitting a next test packet when the ACK of a previous test packet is received, or directly transmitting a next test packet when the ACK of the previous test packet is not received within the third time), counts the first parameters within the first time, and reports the first parameters.

T1 is an access point, and terminals associated with the access point are two, R11 and R12. T1 cyclically transmits test packets to the terminals R11 and R12 (such as transmitting a test packet first to R11, and then transmitting a next test packet to R12 when the ACK of the previous test packet is received, or directly transmitting a next test packet to R12 when the ACK of the previous test packet is not received within the third time), and counts the first parameters related to a rate of success of data transmission between it and the terminals R11 and R12, so as to obtain two first parameters. And in step 905, T1 reports the two first parameters.

How to transmit the data packets and count the first parameters shall be described below by taking a scenario shown in FIG. 6 as an example. And FIG. 6 may be referred to for how to transmit the data packets and count the first parameters in other scenarios, which shall not be described herein any further.

In this embodiment, the test packet may be set to be of a size of a maximum packet. However, this embodiment is not limited thereto; for example, a size of the test packet may be set as demanded.

As described in Embodiment 1, the first parameter may be a ratio of acknowledgement frames to total transmission data frames (ACK ratio), or a rate of success of packet transmission, or a packet drop ratio. The related art may be referred to for its particular calculation manner, and this embodiment is not limited thereto.

In this embodiment, when the first node is a terminal, it reports the first notification and the first parameter to the control node via the AP connected to it; and when the first node is an AP, it directly reports the first notification and the first parameter to the control node.

It can be seen from the above embodiments that in receiving the notifications related to busyness/idleness of channels reported by two different nodes belonging to different basic service sets, controlling the two nodes to transmit test packets; and whether a node is an exposed node may be identified according to parameters related to a rate of success of data transmission reported by the two nodes, which may help diagnose the trouble or performance degradation in a network, with complexity of identification being low, and signaling being simple.

Embodiment 3

Embodiment 3 of this disclosure provides a node diagnosis method, which shall be described from a point of view of a network, with contents identical to those in embodiments 1 and 2 being not going to be described herein any further.

Figure 10:
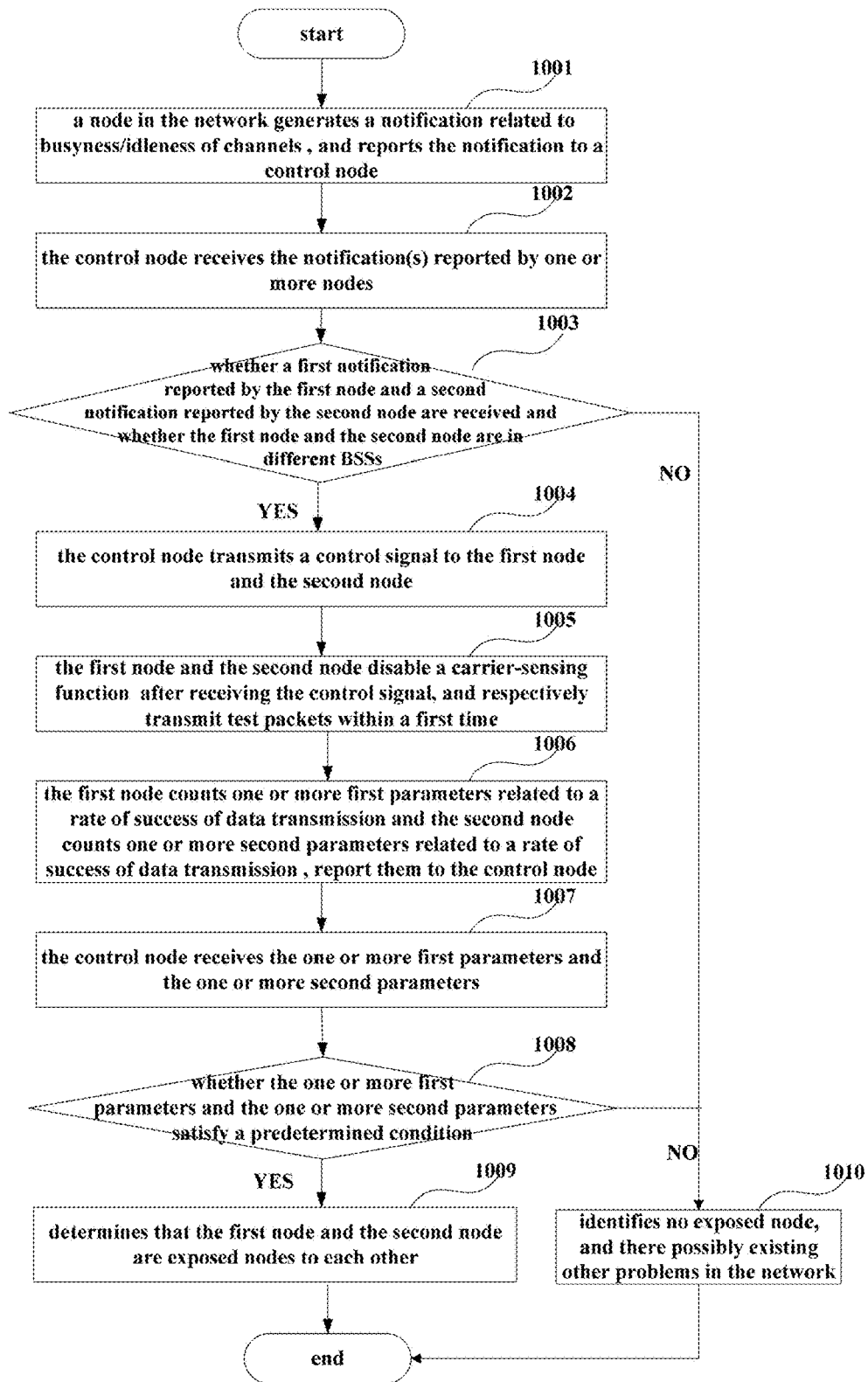
FIG. 10 is a flowchart of a node diagnosis method of Embodiment 3 of this disclosure.

FIG. 10 is a flowchart of the node diagnosis method of the embodiment of this disclosure. As shown in FIG. 10, the node diagnosis method includes:

step 1001: a node in the network generates a notification related to busyness/idleness of channels, and reports the notification to a control node;

in this embodiment, steps 901-902 in Embodiment 2 may be referred to for an implementation of generating the notification and reporting it to the control node by the node (such as a first node or a second node), which shall not be described herein any further;

step 1002: the control node receives the notification(s) reported by one or more nodes;

step 1003: the control node judges whether a first notification related to busyness/idleness of channels reported by the first node and a second notification related to busyness/idleness of channels reported by the second node are received, and whether the first node and the second node are in different basic service sets; and step 1004 is executed when a result of judgment is yes; otherwise, step 1010 is executed;

step 1004: the control node transmits a control signal to the first node and the second node;

step 1005: the first node and the second node disable a carrier-sensing function after receiving the control signal, and respectively transmit test packets within a first time;

step 1006: the first node counts one or more first parameters related to a rate of success of data transmission and the second node counts one or more second parameters related to a rate of success of data transmission, and the first node and the second node report them to the control node;

in this embodiment, steps 903-905 in Embodiment 2 may be referred to for implementations of steps 1005-1006, which shall not be described herein any further;

step 1007: the control node receives the one or more first parameters and the one or more second parameters;

step 1008: the control node judges whether the one or more first parameters and the one or more second parameters satisfy a predetermined condition, and step 1009 is executed when the predetermined condition is satisfied; otherwise, step 1010 is executed;

In this embodiment, step 804 in Embodiment 1 may be referred to for an implementation of the predetermined condition, which shall not be described herein any further;

step 1009: the control node determines that the first node and the second node are exposed nodes to each other; and step 1010: the control node identifies no exposed node, and there possibly existing other problems in the network.

It can be seen from the above embodiments that in receiving the notifications related to busyness/idleness of channels reported by two different nodes belonging to different basic service sets, controlling the two nodes to transmit test packets; and whether a node is an exposed node may be identified according to parameters related to a rate of success of data transmission reported by the two nodes, which may help diagnose the trouble or performance degradation in a network, with complexity of identification being low, and signaling being simple.

Embodiment 4

Embodiment 4 of this disclosure provides a node diagnosis apparatus, configured in a control node. The embodiment of this disclosure corresponds to the node diagnosis method in Embodiment 1, with identical contents being not going to be described herein any further.

Figure 11:
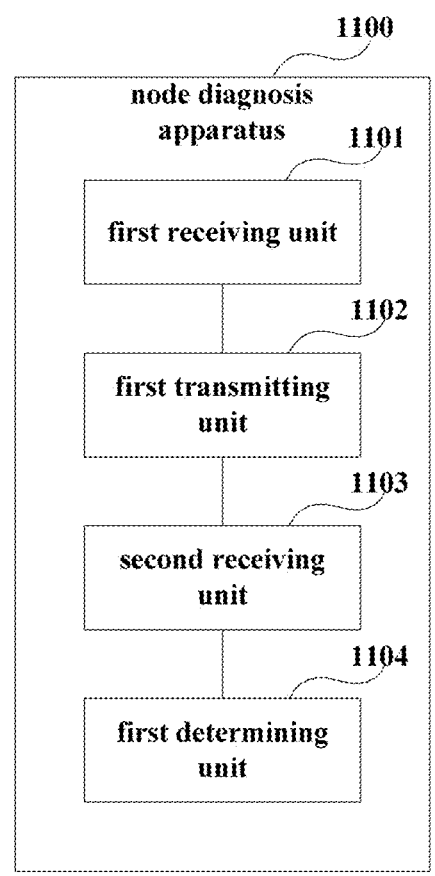
FIG. 11 is a schematic diagram of a node diagnosis apparatus of Embodiment 4 of this disclosure.

FIG. 11 is a schematic diagram of the node diagnosis apparatus of the embodiment of this disclosure. As shown in FIG. 11, the node diagnosis apparatus 1100 includes:

a first receiving unit 1101 configured to receive notifications related to busyness/idleness of channels reported by other nodes;

a first transmitting unit 1102 configured to, when the first receiving unit receives a first notification related to busyness/idleness of channels reported by a first node and a second notification related to busyness/idleness of channels reported by a second node and the first node and the second node are in different basic service sets, transmit a control signal to the first node and the second node, so that the first node and the second node simultaneously transmit test packets respectively within a first time according to the control signal;

a second receiving unit 1103 configured to receive one or more first parameters related to a rate of success of data transmission reported by the first node and one or more second parameters related to a rate of success of data transmission reported by the second node; and a first determining unit 1104 configured to determine that the first node and the second node are exposed nodes when the one or more first parameters and the one or more second parameters satisfy a predetermined condition.

In this embodiment, steps 801-804 in Embodiment 1 may be referred to for implementations of the first receiving unit 1101, the first transmitting unit 1102, the second receiving unit 1103 and the first determining unit 1104.

Figure 12:
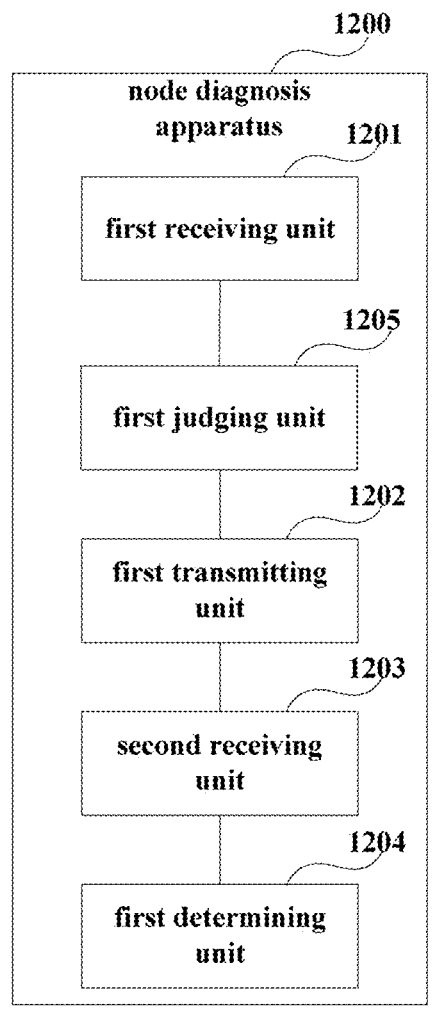
FIG. 12 is a schematic diagram of a node diagnosis apparatus of Embodiment 4 of this disclosure.

FIG. 12 is another schematic diagram of the node diagnosis apparatus of the embodiment of this disclosure. As shown in FIG. 12, the node diagnosis apparatus 1200 includes: a first receiving unit 1201, a first transmitting unit 1202, a second receiving unit 1203 and a first determining unit 1204, with their implementations being identical to those of the first receiving unit 1101, the first transmitting unit 1102, the second receiving unit 1103 and the first determining unit 1104, which shall not be described herein any further.

As shown in FIG. 12, the node diagnosis apparatus 1200 may further include: a first judging unit 1205 configured to judge whether the first receiving unit 1201 receives the first notification related to busyness/idleness of channels reported by the first node and the second notification related to busyness/idleness of channels reported by the second node, and whether the first node and the second node are in different basic service sets;

and the first transmitting unit 1202 transmits the control signal to the first node and the second node when a judgment result of the first judging unit 1205 is yes.

Figure 13:
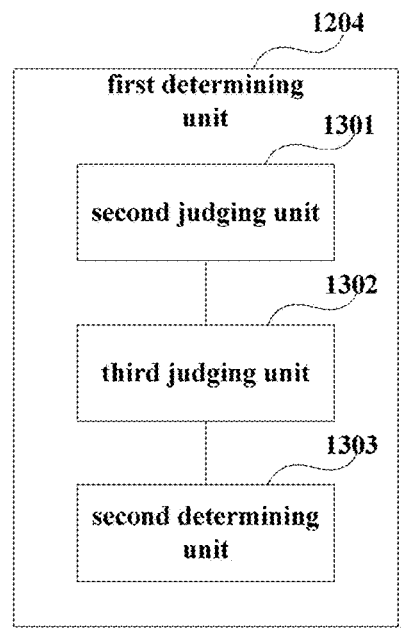
FIG. 13 is a schematic diagram of the first determining unit 1204 of Embodiment 4 of this disclosure.

FIG. 13 is a schematic diagram of the first determining unit 1204 in this embodiment. As shown in FIG. 13, the first determining unit 1204 includes:

a second judging unit 1301 configured to judge whether the number of the first parameters is one or more and the number of the second parameters is one or more;

a third judging unit 1302 configured to judge a magnitude relationship between the first parameters and a first threshold value, and a magnitude relationship between the second parameters and a second threshold value; and a second determining unit 1303 configured to determine that the first node and the second node are exposed nodes in case that, the larger the first parameters and/or the second parameters related to a rate of success of data transmission, the higher the rate of success of data transmission, a judgment result of the second judging unit is that the first node reports one first parameter and the second node reports one second parameter, and a judgment result of the third judging unit is that the first parameter is greater than the first threshold value and the second parameter is greater than the second threshold value, or, the larger the first parameters and/or the second parameters related to a rate of success of data transmission, the higher the rate of success of data transmission, a judgment result of the second judging unit is that the first node reports multiple first parameters and the second node reports one second parameter, and a judgment result of the third judging unit is that each of the first parameters is greater than the first threshold value and the second parameter is greater than the second threshold value, or, the larger the first parameters and/or the second parameters related to a rate of success of data transmission, the higher the rate of success of data transmission, a judgment result of the second judging unit is that the first node reports multiple first parameters and the second node reports multiple second parameters, and a judgment result of the third judging unit is that each of the first parameters is greater than the first threshold value and each of the second parameters is greater than the second threshold value, or, the larger the first parameters and/or the second parameters related to a rate of success of data transmission, the higher the rate of success of data transmission, a judgment result of the second judging unit is that the first node reports one first parameter and the second node reports multiple second parameters, and a judgment result of the third judging unit is that the first parameter is greater than the first threshold value and each of the second parameters is greater than the second threshold value, or, the smaller the first parameters and/or the second parameters related to a rate of success of data transmission, the higher the rate of success of data transmission, a judgment result of the second judging unit is that the first node reports multiple first parameters and the second node reports multiple second parameters, and a judgment result of the third judging unit is that each of the first parameters is less than the first threshold value and each of the second parameters is less than the second threshold value, or, the smaller the first parameters and/or the second parameters related to a rate of success of data transmission, the higher the rate of success of data transmission, a judgment result of the second judging unit is that the first node reports one first parameter and the second node reports multiple second parameters, and a judgment result of the third judging unit is that the first parameter is less than the first threshold value and each of the second parameters is less than the second threshold value, or, the smaller the first parameters and/or the second parameters related to a rate of success of data transmission, the higher the rate of success of data transmission, a judgment result of the second judging unit is that the first node reports one first parameter and the second node reports one second parameter, and a judgment result of the third judging unit is that the first parameter is less than the first threshold value and the second parameter is less than the second threshold value, or, the smaller the first parameters and/or the second parameters related to a rate of success of data transmission, the higher the rate of success of data transmission, a judgment result of the second judging unit is that the first node reports multiple first parameters and the second node reports one second parameter, and a judgment result of the third judging unit is that each of the first parameter is less than the first threshold value and the second parameter is less than the second threshold value.

In this embodiment, the first parameters and/or the second parameters related to a rate of success of data transmission include: a ratio of acknowledgement frames to total transmission data frames within the first time, or a rate of success of packet transmission within the first time, or a packet drop ratio within the first time.

The embodiment of this disclosure further provides a control node, configured with the above node diagnosis apparatus 1100 or 1200.

Figure 14:
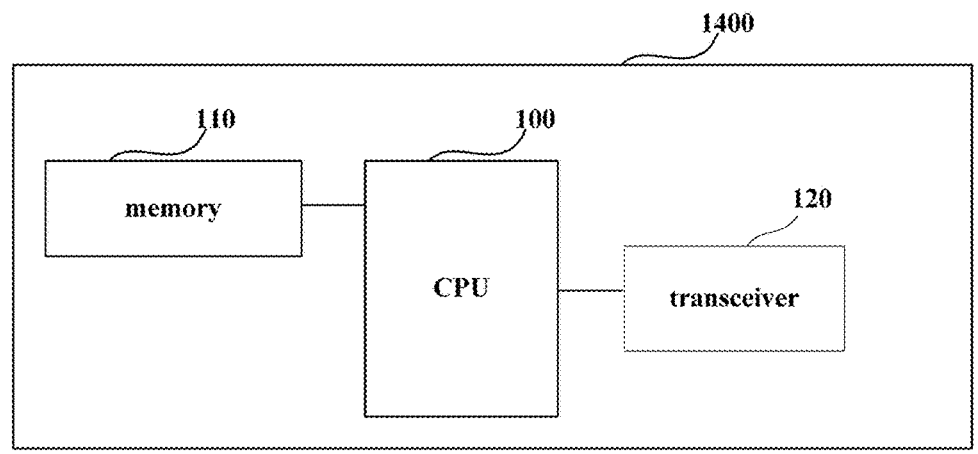
FIG. 14 is a schematic diagram of a control node of Embodiment 4 of this disclosure.

FIG. 14 is a schematic diagram of the control node of the embodiment of this disclosure. As shown in FIG. 14, the control node 1400 may include a central processing unit (CPU) 100 and a memory 110, the memory 110 being coupled to the central processing unit 100. In this embodiment, the memory 110 may store various data, and furthermore, it may store a program for information processing, and execute the program under control of the central processing unit 100.

In an implementation, the functions of the node diagnosis apparatus 1100 or 1200 may be integrated into the central processing unit 100. In this embodiment, the central processing unit 100 may be configured to carry out the node diagnosis method described in Embodiment 1, the contents of which being incorporated herein, and being not going to be described herein any further.

For example, the central processing unit 100 may be configured to perform following control: receive notifications related to busyness/idleness of channels reported by other nodes; when a first notification related to busyness/clearness of channels reported by a first node and a second notification related to busyness/clearness of channels reported by a second node are received and the first node and the second node are in different basic service sets, transmit a control signal to the first node and the second node, so that the first node and the second node simultaneously transmit test packets respectively in a first time according to the control signal; receive one or more first parameters related to a rate of success of data transmission reported by the first node and one or more second parameters related to a rate of success of data transmission reported by the second node; and determine that the first node and the second node are exposed nodes when the one or more first parameters and the one or more second parameters satisfy a predetermined condition.

In another implementation, the node diagnosis apparatus 1100 or 1200 and the central processing unit 100 may be configured separately. For example, the node diagnosis apparatus 1100 or 1200 may be configured as a chip connected to the central processing unit 100, with its functions being realized under control of the central processing unit 100.

Furthermore, as shown in FIG. 14, the control node 1400 may include a transceiver 120, etc. Functions of the above components are similar to those in the related art, and shall not be described herein any further. It should be noted that the control node 1400 does not necessarily include all the parts shown in FIG. 14, and furthermore, the control node 1400 may include parts not shown in FIG. 14, and the related art may be referred to.

It can be seen from the above embodiments that in receiving the notifications related to busyness/idleness of channels reported by two different nodes belonging to different basic service sets, controlling the two nodes to transmit test packets; and whether a node is an exposed node may be identified according to parameters related to a rate of success of data transmission reported by the two nodes, which may help diagnose the trouble or performance degradation in a network, with complexity of identification being low, and signaling being simple.

Embodiment 5

Embodiment 5 of this disclosure provides a node diagnosis apparatus, configured in a first node. The embodiment of this disclosure corresponds to the node diagnosis method in Embodiment 2, with identical contents being not going to be described herein any further.

Figure 15:
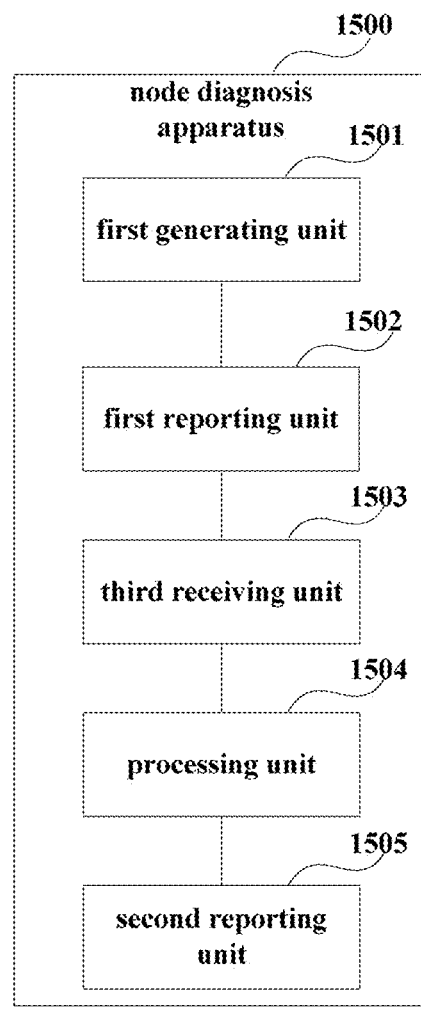
FIG. 15 is a schematic diagram of a node diagnosis apparatus of Embodiment 5 of this disclosure.

FIG. 15 is a schematic diagram of the node diagnosis apparatus of the embodiment of this disclosure. As shown in FIG. 15, the node diagnosis apparatus 1500 includes:

a first generating unit 1501 configured to generate a first notification related to busyness/idleness of channels;

a first reporting unit 1502 configured to report the first notification to a control node;

a third receiving unit 1503 configured to receive a control signal transmitted by the control node; wherein the control signal is transmitted by the control node when the control node determines that it further receives a second notification related to busyness/idleness of channels reported by a second node and the first node and the second node are in different basic service sets;

a processing unit 1504 configured to transmit test packets according to the control signal and count one or more first parameters related to a rate of success of data transmission; and a second reporting unit 1505 configured to report the one or more first parameters, so that the control node determines that the first node and the second node are exposed nodes when the one or more first parameters and one or more second parameters reported by the second node satisfy a predetermined condition.

In this embodiment, steps 901-905 in Embodiment 2 may be referred to for implementations of the first generating unit 1501, the first reporting unit 1502, the third receiving unit 1503, the processing unit 1504 and the second reporting unit 1505.

Figure 16:
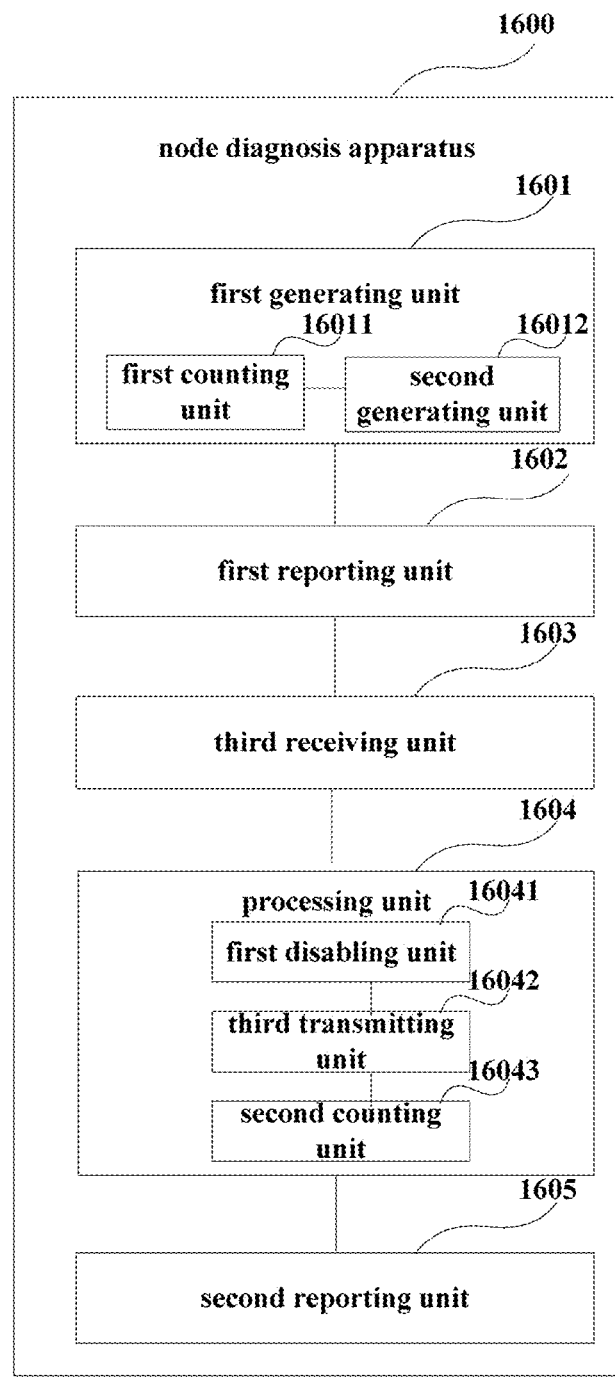
FIG. 16 is a schematic diagram of a node diagnosis apparatus of Embodiment 5 of this disclosure.

FIG. 16 is another schematic diagram of the node diagnosis apparatus of the embodiment of this disclosure. As shown in FIG. 16, the node diagnosis apparatus 1600 includes: a first generating unit 1601, a first reporting unit 1602, a third receiving unit 1603, a processing unit 1604 and a second reporting unit 1605, with their implementations being identical to those of the first generating unit 1501, the first reporting unit 1502, the third receiving unit 1503, the processing unit 1504 and the second reporting unit 1505, which shall not be described herein any further.

As shown in FIG. 16, the first generating unit 1601 includes:

a first counting unit 16011 configured to count a third parameter related to busyness/idleness of channels; and a second generating unit 16012 configured to generate the first notification when the first counting unit 16011 counts that the third parameter is greater than a third threshold value; wherein, the third parameter includes: a ratio of the number of times of assessing that a channel is in a busy state within a second time to a total number of times of sensing channels.

In this embodiment, the processing unit 1604 includes:

a first disabling unit 16041 configured to disable a carrier-sensing function after receiving the control signal;

a third transmitting unit 16042 configured to transmit a next test packet when ACK of a previous test packet is received, or directly transmit a next test packet when ACK of a previous test packet is not received within a third time; and a second counting unit 16043 configured to count one or more first parameters related to a rate of success of data transmission.

In this embodiment, when the first node is a terminal, the number of the first parameters is one, the processing unit 1604 transmits the test packet according to the control signal and count the first parameter, and the second reporting unit 1605 reports the first parameter;

and when the first node is an access point and the number of terminals associated with the access point is multiple, the processing unit 1604 cyclically transmits test packets to multiple terminals successively and counts a first parameter of each terminal to obtain multiple first parameters, and the second reporting unit 1605 reports the multiple first parameters.

The embodiment of this disclosure further provides a first node, configured with the above node diagnosis apparatus 1500 or 1600.

Figure 17:
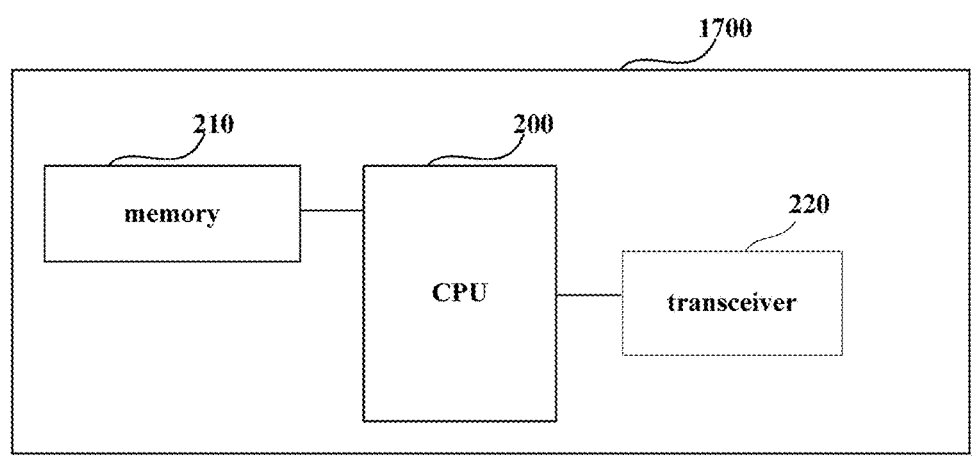
FIG. 17 is a schematic diagram of a first node of Embodiment 5 of this disclosure.

FIG. 17 is a schematic diagram of the first node of the embodiment of this disclosure. As shown in FIG. 17, the first node 1700 may include a central processing unit (CPU) 200 and a memory 210, the memory 210 being coupled to the central processing unit 200. In this embodiment, the memory 210 may store various data, and furthermore, it may store a program for information processing, and execute the program under control of the central processing unit 200.

In an implementation, the functions of the node diagnosis apparatus 1500 or 1600 may be integrated into the central processing unit 200. In this embodiment, the central processing unit 200 may be configured to carry out the node diagnosis method described in Embodiment 2, the contents of which being incorporated herein, and being not going to be described herein any further.

For example, the central processing unit 200 may be configured to perform following control: generate a first notification related to busyness/idleness of channels; report the first notification to a control node; receive a control signal transmitted by the control node; transmit test packets according to the control signal and counting one or more first parameters related to a rate of success of data transmission; and report the one or more first parameters, so that the control node determines that the first node and the second node are exposed nodes when the one or more first parameters and one or more second parameters reported by the second node satisfy a predetermined condition.

In another implementation, the node diagnosis apparatus 1500 or 1600 and the central processing unit may be configured separately. For example, the node diagnosis apparatus 1500 or 1600 may be configured as a chip connected to the central processing unit 200, with its functions being realized under control of the central processing unit 200.

Furthermore, as shown in FIG. 17, the first node 1700 may include a transceiver 220, etc. Functions of the above components are similar to those in the related art, and shall not be described herein any further. It should be noted that the first node 1700 does not necessarily include all the parts shown in FIG. 17, and furthermore, the first node 1700 may include parts not shown in FIG. 17, and the related art may be referred to.

It can be seen from the above embodiments that in receiving the notifications related to busyness/idleness of channels reported by two different nodes belonging to different basic service sets, controlling the two nodes to transmit test packets; and whether a node is an exposed node may be identified according to parameters related to a rate of success of data transmission reported by the two nodes, which may help diagnose the trouble or performance degradation in a network, with complexity of identification being low, and signaling being simple.

Embodiment 6

Embodiment 6 of this disclosure provides a node diagnosis system, including the control node described in Embodiment 4 and the first node described in Embodiment 5; and further including a second node, an implementation of which being similar to that of the first node in Embodiment 4, and being not going to be described herein any further.

In this embodiment, the first node generates a first notification related to busyness/idleness of channels and reports it to the control node, and the second node generates a second notification related to busyness/idleness of channels and reports it to the control node;

the control node is configured to receive the first notification and the second notification and generate a control signal when the first node and the second node are in different basic service sets, and transmit the control signal to the first node and the second node;

the first node is configured to transmit a test packet according to the control signal, count one or more first parameters related to a rate of success of data transmission and report to the control node, and the second node is configured to transmit a test packet according to the control signal, count one or more second parameters related to a rate of success of data transmission and report to the control node;

and the control node is configured to determine that the first node and the second node are exposed nodes according to the one or more first parameters and the one or more second parameters when the one or more first parameters and the one or more second parameters satisfy a predetermined condition.

In this embodiment, embodiments 1-5 may be referred to for implementations of the control node, the first node and the second node, the contents of which being incorporated herein, and being not going to be described herein any further.

It can be seen from the above embodiments that in receiving the notifications related to busyness/idleness of channels reported by two different nodes belonging to different basic service sets, controlling the two nodes to transmit test packets; and whether a node is an exposed node may be identified according to parameters related to a rate of success of data transmission reported by the two nodes, which may help diagnose the trouble or performance degradation in a network, with complexity of identification being low, and signaling being simple.

An embodiment of the present disclosure further provides a computer readable program code, which, when executed in a control node, will cause a computer unit to carry out the node diagnosis method described in Embodiment 1 in the control node.

An embodiment of the present disclosure provides a computer readable medium, including a computer readable program code, which will cause a computer unit to carry out the node diagnosis method described in Embodiment 1 in a control node.

An embodiment of the present disclosure provides a computer readable program code, which, when executed in a common node, will cause a computer unit to carry out the node diagnosis method described in Embodiment 2 in the common node.

An embodiment of the present disclosure provides a computer readable medium, including a computer readable program code, which will cause a computer unit to carry out the node diagnosis method described in Embodiment 2 in a common node.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

For implementations of the present disclosure containing the above embodiments, following supplements are further disclosed.

Supplement 1. A node diagnosis apparatus, configured in a control node, characterized in that the node diagnosis apparatus includes:

a first receiving unit configured to receive notifications related to busyness/idleness of channels reported by other nodes;

a first transmitting unit configured to, when the first receiving unit receives a first notification related to busyness/idleness of channels reported by a first node and a second notification related to busyness/idleness of channels reported by a second node and the first node and the second node are in different basic service sets, transmit a control signal to the first node and the second node, so that the first node and the second node simultaneously transmit test packets respectively within a first time according to the control signal;

a second receiving unit configured to receive one or more first parameters related to a rate of success of data transmission reported by the first node and one or more second parameters related to a rate of success of data transmission reported by the second node; and a first determining unit configured to determine that the first node and the second node are exposed nodes when the one or more first parameters and the one or more second parameters satisfy a predetermined condition.

Supplement 2. The node diagnosis apparatus according to supplement 1, wherein the node diagnosis apparatus further includes:

a first judging unit configured to judge whether the first receiving unit receives the first notification related to busyness/idleness of channels reported by the first node and the second notification related to busyness/idleness of channels reported by the second node, and whether the first node and the second node are in different basic service sets;

and the first transmitting unit transmits the control signal to the first node and the second node when a judgment result of the first judging unit is yes.

Supplement 3. The node diagnosis apparatus according to supplement 1, wherein the first determining unit includes:

a second judging unit configured to judge whether the number of the first parameters is one or more and the number of the second parameters is one or more;

a third judging unit configured to judge a magnitude relationship between the first parameters and a first threshold value, and a magnitude relationship between the second parameters and a second threshold value; and a second determining unit configured to determine that the first node and the second node are exposed nodes in case that, the larger the first parameters and/or the second parameters related to a rate of success of data transmission, the higher the rate of success of data transmission, a judgment result of the second judging unit is that the first node reports one first parameter and the second node reports one second parameter, and a judgment result of the third judging unit is that the first parameter is greater than the first threshold value and the second parameter is greater than the second threshold value, or, the larger the first parameters and/or the second parameters related to a rate of success of data transmission, the higher the rate of success of data transmission, a judgment result of the second judging unit is that the first node reports multiple first parameters and the second node reports one second parameter, and a judgment result of the third judging unit is that each of the first parameters is greater than the first threshold value and the second parameter is greater than the second threshold value, or, the larger the first parameters and/or the second parameters related to a rate of success of data transmission, the higher the rate of success of data transmission, a judgment result of the second judging unit is that the first node reports multiple first parameters and the second node reports multiple second parameters, and a judgment result of the third judging unit is that each of the first parameters is greater than the first threshold value and each of the second parameters is greater than the second threshold value, or, the larger the first parameters and/or the second parameters related to a rate of success of data transmission, the higher the rate of success of data transmission, a judgment result of the second judging unit is that the first node reports one first parameter and the second node reports multiple second parameters, and a judgment result of the third judging unit is that the first parameter is greater than the first threshold value and each of the second parameters is greater than the second threshold value, or, the smaller the first parameters and/or the second parameters related to a rate of success of data transmission, the higher the rate of success of data transmission, a judgment result of the second judging unit is that the first node reports multiple first parameters and the second node reports multiple second parameters, and a judgment result of the third judging unit is that each of the first parameters is less than the first threshold value and each of the second parameters is less than the second threshold value, or, the smaller the first parameters and/or the second parameters related to a rate of success of data transmission, the higher the rate of success of data transmission, a judgment result of the second judging unit is that the first node reports one first parameter and the second node reports multiple second parameters, and a judgment result of the third judging unit is that the first parameter is less than the first threshold value and each of the second parameters is less than the second threshold value, or, the smaller the first parameters and/or the second parameters related to a rate of success of data transmission, the higher the rate of success of data transmission, a judgment result of the second judging unit is that the first node reports one first parameter and the second node reports one second parameter, and a judgment result of the third judging unit is that the first parameter is less than the first threshold value and the second parameter is less than the second threshold value, or, the smaller the first parameters and/or the second parameters related to a rate of success of data transmission, the higher the rate of success of data transmission, a judgment result of the second judging unit is that the first node reports multiple first parameters and the second node reports one second parameter, and a judgment result of the third judging unit is that each of the first parameter is less than the first threshold value and the second parameter is less than the second threshold value.

Supplement 4. The node diagnosis apparatus according to supplement 1, wherein the first parameters and/or the second parameters related to a rate of success of data transmission include: a ratio of acknowledgement frames to total transmission data frames within the first time, or a rate of success of packet transmission within the first time, or a packet drop ratio within the first time.

Supplement 5. A node diagnosis apparatus, configured in a first node, characterized in that the node diagnosis apparatus includes:

a first generating unit configured to generate a first notification related to busyness/idleness of channels;

a first reporting unit configured to report the first notification to a control node;

a third receiving unit configured to receive a control signal transmitted by the control node; wherein the control signal is transmitted by the control node when the control node determines that it further receives a second notification related to busyness/idleness of channels reported by a second node and the first node and the second node are in different basic service sets;

a processing unit configured to transmit test packets according to the control signal and count one or more first parameters related to a rate of success of data transmission; and a second reporting unit configured to report the one or more first parameters, so that the control node determines that the first node and the second node are exposed nodes when the one or more first parameters and one or more second parameters reported by the second node satisfy a predetermined condition.

Supplement 6. The node diagnosis apparatus according to supplement 5, wherein the first generating unit further includes:

a first counting unit configured to count a third parameter related to busyness/idleness of channels; and second generating unit configured to generate the first notification when the first counting unit counts that the third parameter is greater than a third threshold value; wherein, the third parameter includes: a ratio of the number of times of assessing that a channel is in a busy state within a second time to a total number of times of sensing channels.

Supplement 7. The node diagnosis apparatus according to supplement 5, wherein the processing unit includes:

a first disabling unit configured to disable a carrier-sensing function after receiving the control signal;

a third transmitting unit configured to transmit a next test packet when ACK of a previous test packet is received, or directly transmit a next test packet when ACK of a previous test packet is not received within a third time; and a second counting unit configured to count one or more first parameters related to a rate of success of data transmission.

Supplement 8. The node diagnosis apparatus according to supplement 5, wherein when the first node is a terminal, the number of the first parameters is one, the processing unit transmits the test packet according to the control signal and count the first parameter, and the second reporting unit reports the first parameter;

and when the first node is an access point and the number of terminals associated with the access point is multiple, the processing unit cyclically transmits test packets to multiple terminals successively and counts a first parameter of each terminal to obtain multiple first parameters, and the second reporting unit reports the multiple first parameters.

Supplement 9. A node diagnosis system, including a control node, a first node and a second node, characterized in that, the first node is configured to generate a first notification related to busyness/idleness of channels and report it to the control node;

the second node is configured to generate a second notification related to busyness/idleness of channels and report it to the control node;

the control node is configured to receive the first notification and the second notification and generate a control signal when the first node and the second node are in different basic service sets, and transmit the control signal to the first node and the second node;

the first node is configured to transmit a test packet according to the control signal, count one or more first parameters related to a rate of success of data transmission and report to the control node, and the second node is configured to transmit a test packet according to the control signal, count one or more second parameters related to a rate of success of data transmission and report to the control node;

and the control node is configured to determine that the first node and the second node are exposed nodes according to the one or more first parameters and the one or more second parameters when the one or more first parameters and the one or more second parameters satisfy a predetermined condition.

Supplement 10. The node diagnosis system according to supplement 9, wherein the first node and/or the second node is/are configured to count a third parameter related to busyness/idleness of channels; and the first node and/or the second node is/are configured to count to generate the first notification and/or the second notification when the third parameter is greater than a third threshold value; and wherein the third parameter includes: a ratio of the number of times of assessing that a channel is in a busy state within a second time to a total number of times of sensing channels.

Supplement 11. The node diagnosis system according to supplement 9, wherein the control node is configured to judge whether a first notification related to busyness/idleness of channels reported by the first node and a second notification related to busyness/idleness of channels reported by the second node are received, and whether the first node and the second node are in different basic service sets;

and when a result of judgment is yes, the control node is configured to transmit the control signal to the first node and the second node by the control node.

Supplement 12. The node diagnosis system according to supplement 9, wherein the control node is configured to judge whether the number of the first parameters is one or more and the number of the second parameters is one or more, and judge a magnitude relationship between the first parameters and a first threshold value, and a magnitude relationship between the second parameters and a second threshold value;

and determine that the first node and the second node are exposed nodes in case that, the larger the first parameters and/or the second parameters related to a rate of success of data transmission, the higher the rate of success of data transmission, a judgment result is that the first node reports one first parameter and the second node reports one second parameter, and a judgment result is that the first parameter is greater than the first threshold value and the second parameter is greater than the second threshold value, or, the larger the first parameters and/or the second parameters related to a rate of success of data transmission, the higher the rate of success of data transmission, a judgment result is that the first node reports multiple first parameters and the second node reports one second parameter, and a judgment result is that each of the first parameters is greater than the first threshold value and the second parameter is greater than the second threshold value, or, the larger the first parameters and/or the second parameters related to a rate of success of data transmission, the higher the rate of success of data transmission, a judgment result is that the first node reports multiple first parameters and the second node reports multiple second parameters, and a judgment result is that each of the first parameters is greater than the first threshold value and each of the second parameters is greater than the second threshold value, or, the larger the first parameters and/or the second parameters related to a rate of success of data transmission, the higher the rate of success of data transmission, a judgment result is that the first node reports one first parameter and the second node reports multiple second parameters, and a judgment result is that the first parameter is greater than the first threshold value and each of the second parameters is greater than the second threshold value, or, the smaller the first parameters and/or the second parameters related to a rate of success of data transmission, the higher the rate of success of data transmission, a judgment result is that the first node reports multiple first parameters and the second node reports multiple second parameters, and a judgment result is that each of the first parameters is less than the first threshold value and each of the second parameters is less than the second threshold value, or, the smaller the first parameters and/or the second parameters related to a rate of success of data transmission, the higher the rate of success of data transmission, a judgment result is that the first node reports one first parameter and the second node reports multiple second parameters, and a judgment result is that the first parameter is less than the first threshold value and each of the second parameters is less than the second threshold value, or, the smaller the first parameters and/or the second parameters related to a rate of success of data transmission, the higher the rate of success of data transmission, a judgment result is that the first node reports one first parameter and the second node reports one second parameter, and a judgment result is that the first parameter is less than the first threshold value and the second parameter is less than the second threshold value, or, the smaller the first parameters and/or the second parameters related to a rate of success of data transmission, the higher the rate of success of data transmission, a judgment result is that the first node reports multiple first parameters and the second node reports one second parameter, and a judgment result is that each of the first parameter is less than the first threshold value and the second parameter is less than the second threshold value.

Supplement 13. The node diagnosis system according to supplement 9, wherein the first parameters and/or the second parameters related to a rate of success of data transmission include: a ratio of acknowledgement frames to total transmission data frames within the first time, or a rate of success of packet transmission within the first time, or a packet drop ratio within the first time.

Supplement 14. The node diagnosis system according to supplement 9, wherein the first node and the second node are configured to disable a carrier-sensing function after receiving the control signal, transmit a next test packet when ACK of a previous test packet is received, or directly transmit a next test packet when ACK of a previous test packet is not received within a third time, and count one or more first parameters and/or second parameters related to a rate of success of data transmission.

Supplement 15. The node diagnosis system according to supplement 9, wherein when the first node is a terminal, the number of the first parameters is one, the first node is configured to transmit the test packet according to the control signal and count the first parameter, and the first node is configured to report the first parameter;

and when the first node is an access point and the number of terminals associated with the access point is multiple, the first node is configured to cyclically transmit test packets to multiple terminals successively and count a first parameter of each terminal to obtain multiple first parameters, and the first node is configured to report the multiple first parameters;

when the second node is a terminal, the number of the second parameters is one, the second node is configured to transmit the test packet according to the control signal and count the first parameter, and the second node is configured to report the second parameter;

and when the second node is an access point and the number of terminals associated with the access point is multiple, the second node is configured to cyclically transmit test packets to multiple terminals successively and count a second parameter of each terminal to obtain multiple second parameters, and the second node is configured to report the multiple second parameters.

The invention claimed is:

1. A node diagnosis apparatus, configured in a control node, comprising:
   a first receiving unit receives notifications related to busyness or idleness of channels reported by other nodes;
   a first transmitting unit, when the first receiving unit receives a first notification related to busyness or idleness of channels reported by a first node and a second notification related to busyness or idleness of channels reported by a second node and the first node and the second node are in different basic service sets, transmits a control signal to the first node and the second node, so that the first node and the second node simultaneously transmit test packets respectively within a first time according to the control signal;
   a second receiving unit receives one or more first parameters related to a rate of success of data transmission reported by the first node and one or more second parameters related to a rate of success of data transmission reported by the second node; and
   a first determining unit determines that the first node and the second node are exposed nodes when the one or more first parameters and the one or more second parameters satisfy a predetermined condition;
   wherein the first determining a second judging unit judges whether the number of the first parameters is one or more and the number of the second parameters is one or more;
   a third judging unit judges a magnitude relationship between the first parameters and a first threshold value, and a magnitude relationship between the second parameters and a second threshold value; and
   a second determining unit determines that the first node and the second node are exposed nodes in case that,
   the larger the first parameters and/or the second parameters related to a rate of success of data transmission, the higher the rate of success of data transmission, a judgment result of the second judging unit is that the first node reports one first parameter and the second node reports one second parameter, and a judgment result of the third judging unit is that the first parameter is greater than the first threshold value and the second parameter is greater than the second threshold value,
   or, the larger the first parameters and/or the second parameters related to a rate of success of data transmission, the higher the rate of success of data transmission, a judgment result of the second judging unit is that the first node reports multiple first parameters and the second node reports one second parameter, and a judgment result of the third judging unit is that each of the first parameters is greater than the first threshold value and the second parameter is greater than the second threshold value,
   or, the larger the first parameters and/or the second parameters related to a rate of success of data transmission, the higher the rate of success of data transmission, a judgment result of the second judging unit is that the first node reports multiple first parameters and the second node reports multiple second parameters, and a judgment result of the third judging unit is that each of the first parameters is greater than the first threshold value and each of the second parameters is greater than the second threshold value,
   or, the larger the first parameters and/or the second parameters related to a rate of success of data transmission, the higher the rate of success of data transmission, a judgment result of the second judging unit is that the first node reports one first parameter and the second node reports multiple second parameters, and a judgment result of the third judging unit is that the first parameter is greater than the first threshold value and each of the second parameters is greater than the second threshold value,
   or, the smaller the first parameters and/or the second parameters related to a rate of success of data transmission, the higher the rate of success of data transmission, a judgment result of the second judging unit is that the first node reports multiple first parameters and the second node reports multiple second parameters, and a judgment result of the third judging unit is that each of the first parameters is less than the first threshold value and each of the second parameters is less than the second threshold value,
   or, the smaller the first parameters and/or the second parameters related to a rate of success of data transmission, the higher the rate of success of data transmission, a judgment result of the second judging unit is that the first node reports one first parameter and the second node reports multiple second parameters, and a judgment result of the third judging unit is that the first parameter is less than the first threshold value and each of the second parameters is less than the second threshold value,
   or, the smaller the first parameters and/or the second parameters related to a rate of success of data transmission, the higher the rate of success of data transmission, a judgment result of the second judging unit is that the first node reports one first parameter and the second node reports one second parameter, and a judgment result of the third judging unit is that the first parameter is less than the first threshold value and the second parameter is less than the second threshold value,
   or, the smaller the first parameters and/or the second parameters related to a rate of success of data transmission, the higher the rate of success of data transmission, a judgment result of the second judging unit is that the first node reports multiple first parameters and the second node reports one second parameter, and a judgment result of the third judging unit is that each of the first parameter is less than the first threshold value and the second parameter is less than the second threshold value.

2. The node diagnosis apparatus according to claim 1, wherein the node diagnosis apparatus further includes:
   a first judging unit judges whether the first receiving unit receives the first notification related to busyness or idleness of channels reported by the first node and the second notification related to busyness or idleness of channels reported by the second node, and whether the first node and the second node are in different basic service sets;
   and the first transmitting unit transmits the control signal to the first node and the second node when a judgment result of the first judging unit is yes.

3. The node diagnosis apparatus according to claim 1, wherein the first parameters and/or the second parameters related to a rate of success of data transmission include: a ratio of acknowledgement frames to total transmission data frames within the first time, or a rate of success of packet transmission within the first time, or a packet drop ratio within the first time.

4. A node diagnosis apparatus, configured in a first node, comprising:
   a first generating unit generates a first notification related to busyness or idleness of channels;
   a first reporting unit reports the first notification to a control node;
   a third receiving unit receives a control signal transmitted by the control node; wherein the control signal is transmitted by the control node when the control node determines that the control node further receives a second notification related to busyness or idleness of channels reported by a second node and the first node and the second node are in different basic service sets;
   a processing unit transmits test packets according to the control signal and count one or more first parameters related to a rate of success of data transmission; and
   a second reporting unit reports the one or more first parameters, so that the control node determines that the first node and the second node are exposed nodes when the one or more first parameters and one or more second parameters reported by the second node satisfy a predetermined condition;
   wherein the processing unit includes:
   a first disabling unit disables a carrier-sensing function after receiving the control signal;
   a third transmitting unit transmits a next test packet when ACK of a previous test packet is received, or directly transmit a next test packet when ACK of a previous test packet is not received within a third time; and
   a second counting unit counts one or more first parameters related to a rate of success of data transmission.

5. The node diagnosis apparatus according to claim 4, wherein the first generating unit further includes:
   a first counting unit counts a third parameter related to busyness or idleness of channels; and
   a second generating unit generates the first notification when the first counting unit counts that the third parameter is greater than a third threshold value;
   wherein, the third parameter includes: a ratio of the number of times of assessing that a channel is in a busy state within a second time to a total number of times of sensing channels.

6. The node diagnosis apparatus according to claim 4, wherein when the first node is a terminal, the number of the first parameters is one, the processing unit transmits the test packet according to the control signal and count the first parameter, and the second reporting unit reports the first parameter;
   and when the first node is an access point and the number of terminals associated with the access point is multiple, the processing unit cyclically transmits test packets to multiple terminals successively and counts a first parameter of each terminal to obtain multiple first parameters, and the second reporting unit reports the multiple first parameters.

7. A node diagnosis system, including a control node, a first node and a second node, comprising,
   the first node generates a first notification related to busyness or idleness of channels and reports to the control node;
   the second node generates a second notification related to busyness or idleness of channels and reports to the control node;
   the control node receives the first notification and the second notification and generates a control signal when the first node and the second node are in different basic service sets, and transmits the control signal to the first node and the second node;
   the first node transmits a test packet according to the control signal, counts one or more first parameters related to a rate of success of data transmission and reports to the control node, and the second node transmits a test packet according to the control signal, counts one or more second parameters related to a rate of success of data transmission and reports to the control node;
   and the control node determines that the first node and the second node are exposed nodes according to the one or more first parameters and the one or more second parameters when the one or more first parameters and the one or more second parameters satisfy a predetermined condition;
   wherein the control node judges whether the number of the first parameters is one or more and the number of the second parameters is one or more, and judges a magnitude relationship between the first parameters and a first threshold value, and a magnitude relationship between the second parameters and a second threshold value;
   and determines that the first node and the second node are exposed nodes in case that,
   the larger the first parameters and/or the second parameters related to a rate of success of data transmission, the higher the rate of success of data transmission, a judgment result is that the first node reports one first parameter and the second node reports one second parameter, and a judgment result is that the first parameter is greater than the first threshold value and the second parameter is greater than the second threshold value,
   or, the larger the first parameters and/or the second parameters related to a rate of success of data transmission, the higher the rate of success of data transmission, a judgment result is that the first node reports multiple first parameters and the second node reports one second parameter, and a judgment result is that each of the first parameters is greater than the first threshold value and the second parameter is greater than the second threshold value,
   or, the larger the first parameters and/or the second parameters related to a rate of success of data transmission, the higher the rate of success of data transmission, a judgment result is that the first node reports multiple first parameters and the second node reports multiple second parameters, and a judgment result is that each of the first parameters is greater than the first threshold value and each of the second parameters is greater than the second threshold value,
   or, the larger the first parameters and/or the second parameters related to a rate of success of data transmission, the higher the rate of success of data transmission, a judgment result is that the first node reports one first parameter and the second node reports multiple second parameters, and a judgment result is that the first parameter is greater than the first threshold value and each of the second parameters is greater than the second threshold value, or, the smaller the first parameters and/or the second parameters related to a rate of success of data transmission, the higher the rate of success of data transmission, a judgment result is that the first node reports multiple first parameters and the second node reports multiple second parameters, and a judgment result is that each of the first parameters is less than the first threshold value and each of the second parameters is less than the second threshold value, or, the smaller the first parameters and/or the second parameters related to a rate of success of data transmission, the higher the rate of success of data transmission, a judgment result is that the first node reports one first parameter and the second node reports multiple second parameters, and a judgment result is that the first parameter is less than the first threshold value and each of the second parameters is less than the second threshold value, or, the smaller the first parameters and/or the second parameters related to a rate of success of data transmission, the higher the rate of success of data transmission, a judgment result is that the first node reports one first parameter and the second node reports one second parameter, and a judgment result is that the first parameter is less than the first threshold value and the second parameter is less than the second threshold value, or, the smaller the first parameters and/or the second parameters related to a rate of success of data transmission, the higher the rate of success of data transmission, a judgment result is that the first node reports multiple first parameters and the second node reports one second parameter, and a judgment result is that each of the first parameter is less than the first threshold value and the second parameter is less than the second threshold value.

8. The node diagnosis system according to claim 7, wherein the first node and/or the second node count(s) a third parameter related to busyness or idleness of channels; and the first node and/or the second node count(s) to generate the first notification and/or the second notification when the third parameter is greater than a third threshold value; and wherein the third parameter includes: a ratio of the number of times of assessing that a channel is in a busy state within a second time to a total number of times of sensing channels.

9. The node diagnosis system according to claim 7, wherein the control node judges whether a first notification related to busyness or idleness of channels reported by the first node and a second notification related to busyness or idleness of channels reported by the second node are received, and whether the first node and the second node are in different basic service sets; and when a result of judgment is yes, the control node transmits the control signal to the first node and the second node by the control node.

10. The node diagnosis system according to claim 7, wherein the first parameters and/or the second parameters related to a rate of success of data transmission include: a ratio of acknowledgement frames to total transmission data frames within the first time, or a rate of success of packet transmission within the first time, or a packet drop ratio within the first time.

11. The node diagnosis system according to claim 7, wherein the first node and the second node disable a carrier-sensing function after receiving the control signal, transmit a next test packet when ACK of a previous test packet is received, or directly transmit a next test packet when ACK of a previous test packet is not received within a third time, and count one or more first parameters and/or second parameters related to a rate of success of data transmission.

12. The node diagnosis system according to claim 7, wherein when the first node is a terminal, the number of the first parameters is one, the first node transmits the test packet according to the control signal and count the first parameter, and the first node reports the first parameter;

and when the first node is an access point and the number of terminals associated with the access point is multiple, the first node cyclically transmits test packets to multiple terminals successively and counts a first parameter of each terminal to obtain multiple first parameters, and the first node reports the multiple first parameters;

when the second node is a terminal, the number of the second parameters is one, the second node transmits the test packet according to the control signal and counts the first parameter, and the second node reports the second parameter;

and when the second node is an access point and the number of terminals associated with the access point is multiple, the second node cyclically transmits test packets to multiple terminals successively and counts a second parameter of each terminal to obtain multiple second parameters, and the second node reports the multiple second parameters.

\* \* \* \* \*